United States Patent
Pritschins et al.

(10) Patent No.: US 7,317,062 B2
(45) Date of Patent: Jan. 8, 2008

(54) COPOLYMERS, PREPARATION THEREOF AND USE AS WETTING AGENTS AND DISPERSANTS

(75) Inventors: Wolfgang Pritschins, Wesel (DE); Karlheinz Haubennestel, Wesel (DE); Werner Tiegs, Rees (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 11/225,397

(22) Filed: Sep. 13, 2005

(65) Prior Publication Data

US 2006/0069224 A1    Mar. 30, 2006

(30) Foreign Application Priority Data

Sep. 14, 2004   (DE) .................... 10 2004 044 879

(51) Int. Cl.
*C08F 20/06*   (2006.01)
*C08F 120/06*  (2006.01)

(52) U.S. Cl. ............... 526/317.1; 526/318; 526/318.2; 526/329.7; 526/307.2; 526/307.5

(58) Field of Classification Search ............ 526/317.1, 526/318, 318.2, 329.7, 307.2, 307.5
See application file for complete search history.

(56) References Cited

U.S. PATENT DOCUMENTS

| | | | |
|---|---|---|---|
| 3,663,484 A | 5/1972 | Broecker | |
| 5,102,742 A | 4/1992 | Hoflan et al. | |
| 5,352,729 A | 10/1994 | Birkhofer et al. | |
| 5,585,427 A | 12/1996 | Schimmel et al. | |
| 5,792,729 A | 8/1998 | Harrison et al. | |
| 6,336,942 B1 * | 1/2002 | Danisch et al. | ............... 8/94.21 |

FOREIGN PATENT DOCUMENTS

| | | |
|---|---|---|
| DE | 4214011 | 11/1993 |
| EP | 1 142 972 A2 * | 10/2001 |
| EP | 1142972 | 10/2001 |
| GB | 1093081 | 1/1967 |

* cited by examiner

*Primary Examiner*—Ling-Sui Choi
(74) *Attorney, Agent, or Firm*—Schwegman, Lundberg & Woessner P.A.

(57) ABSTRACT

The invention relates to copolymers, suitable as wetting agents and dispersants, obtainable by copolymerizing (a) 1 to 80 mol % of at least one ethylenically unsaturated 1,2-dicarboxylic acid derivative, (b) 2 to 80 mol % of at least one unsaturated monocarboxylic acid derivative having 12 to 30 carbon atoms, (c) 1 to 90 mol % of at least one polyalkyleneoxyallyl ether having a number-average molecular weight of up to 5000 g/mol and (d) 0 to 30 mol % of further, unsaturated monomers; and also reaction products of the copolymers with ammonia, amines, water, alcohols, amino alcohols and/or alkali metal hydroxides or alkaline earth metal hydroxides. The invention further relates to a process for preparing the copolymers and to their use as wetting agents and dispersants in coating materials and moulding compounds.

11 Claims, No Drawings

COPOLYMERS, PREPARATION THEREOF AND USE AS WETTING AGENTS AND DISPERSANTS

RELATED APPLICATION

This application claims priority under 35 U.S.C. 119 to German Application No. 10 2004 044 879.5, filed Sep. 14, 2004, which application is incorporated herein by reference and made a part hereof.

The present invention relates to copolymers based on dicarboxylic acids and/or derivatives thereof, unsaturated monocarboxylic acids and allyl polyether derivatives. The invention further relates to a process for preparing these copolymers and their precursors, and also to the use of the copolymers, in particular as wetting agents and dispersants.

Particularly in connection with the preparation of coating compositions which are pigmented or comprise fillers it is important to achieve a uniform and fine distribution of particulate solids in the coating system. If the incorporation of the particulate solids is not optimum, this can lead to flocculation, loss of gloss, colour changes, sedimentation and an impairment of the flow properties. Only wetting agents and dispersants make it possible to incorporate particulate solids uniformly in systems of this kind.

Increasingly there is a rise in demand for solvent-free coating compositions, which alongside solventborne systems can be used for a wide variety of coating tasks, such as painting tasks, for example. On account of the diversity of possible systems there is also an increase in the demand for tailor-made wetting agents and dispersants which can be used for specific purposes and areas of application.

EP 1 142 972 A2 describes the use of copolymers of unsaturated dicarboxylic acids and vinyl-functionalized polyethers for producing aqueous pigment preparations. On account of the limited availability of different oxyalkylene glycol or polyalkylene oxide vinyl ethers, however, there are only limited possibilities for providing copolymers tailored to particular systems.

EP 0 542 033 A2 discloses the use of pigment preparations which besides the pigment and customary auxiliaries comprise a copolymer obtained from a monoethylenically unsaturated dicarboxylic acid or its anhydride and also from monoolefins and/or alkyl vinyl ethers. The use of olefins, however, leads in many cases to disruptions to the wetting and dispersing action of the products. Furthermore, in copolymers into which hydrocarbons are copolymerized, there is usually a residual hydrocarbon monomer content, which besides odour problems causes turbidity when used in aqueous systems.

GB 1,093,081 as well discloses the use of copolymers of maleic acid derivatives and olefins in dispersions of fine particles. On account of the use of olefins, however, these copolymers likewise possess the disadvantages specified above.

DE 195 08 655 A1 describes the use of copolymers of monoethylenically unsaturated dicarboxylic acids or their anhydrides with branched olefin oligomers. As an option it is also possible to copolymerize allyl alkyl ethers into the polymer, or monoethylenically unsaturated, short-chain— i.e. $C_3$ to $C_{10}$ monocarboxylic acids.

U.S. Pat. No. 5,585,427 discloses the copolymerization of polyethers of modified dicarboxylic acid derivatives with various vinyl compounds to form copolymers having an acid number of less than 1. A disadvantageous consequence is that the polyether esters formed lack long-term stability in an aqueous medium.

DE 42 14 011 C1 describes copolymers comprising two components, particularly for treating leather and fur skins, which are obtained by polymerization from an ethylenically unsaturated dicarboxylic anhydride, dicarboxylic ester and/or dicarboxylic amide, and an unsaturated compound which contains a terminal or exo-positioned double bond.

EP 0 831 104 A2 discloses terpolymers of an unsaturated acidic reactant, such as maleic acid, for example, a 1-olefin and a 1,1-disubstituted olefin. These terpolymers are disadvantageous for the reasons specified above, and are used as dispersants in lubricating oils and sedimentation inhibitors in hydrocarbon fuels.

One of the objects of the present invention is to provide copolymers, and also precursors thereof, that are an improvement on the prior art. The copolymers ought to be suitable in particular as wetting agents and dispersants and ought to avoid the disadvantages of the copolymers of the prior art. The precursors of the copolymers of the invention ought, moreover, to allow as far as possible a tailor-made conversion for broad areas of application beyond those of the paints and coatings area. Accordingly, depending on the chosen further reaction, the products resulting from the precursors ought to be able to be used in solventborne, waterborne and/or solvent-free systems such as, for example, paints, printing inks, pigment concentrates and/or polymeric compositions.

These and other objects have been achieved through the provision of copolymers that are copolymerization products of:

(a) 1 to 80 mol % of at least one ethylenically unsaturated 1,2-dicarboxylic acid derivative, (b) 2 to 80 mol % of at least one unsaturated monocarboxylic acid derivative having 12 to 30 carbon atoms, (c) 1 to 90 mol % of at least one polyalkyleneoxyallyl ether having a number-average molecular weight of up to 5000 g/mol and (d) 0 to 30 mol % of further, unsaturated monomers other than (a), (b) and (c).

Optionally, the copolymers may be converted to salt form a by their reaction with ammonia, amines, water, alcohols, amino alcohols and/or alkali metal hydroxides or alkaline earth metal hydroxides.

Monomers (a)

Monomers (a) are ethylenically unsaturated 1,2-dicarboxylic acid compounds, especially 1,2-dicarboxylic anhydrides having 4 to 8 carbon atoms, preferably maleic anhydride.

Alternatively or in combination therewith it is possible as monomers (a) to use the monoesters or diesters of the 1,2-dicarboxylic acid compounds, such as of maleic acid, fumaric acid, itaconic acid, mesaconic acid and citraconic acid, for example. The alcohols of such esters are straight-chain or branched and contain 1 to 30 carbon atoms and, if desired, cycloaliphatic, aromatic and/or araliphatic groups. Suitable alcohols include $C_1$-$C_4$ alkylene oxide adducts of the said alcohols, such as, for example, 2-butoxyethanol, diethylene glycol monobutyl ether, triethylene glycol monobutyl ether, propylene glycol monomethyl ether, 2-phenoxyethanol or 2-(2-phenoxyethoxy)ethanol.

Further monomers which may be specified as monomers (a) include, for example, monobutyl maleate, dibutyl maleate, monooctadecyl maleate, monooctadecyl 3 EO-maleate, dimethyl maleate, di-2-ethylhexyl maleate, di-2-ethylhexyl fumarate, diisotridecyl maleate and dioctadecenyl fumarate.

The monomers (a) further include monoamides, diamides and imides of the monomeric 1,2-dicarboxylic acid derivatives, again including maleic acid, fumaric acid, itaconic acid, mesaconic acid and citraconic acid. These compounds are based on primary and/or secondary amines or amino alcohols having 1 to 20 carbon atoms, and also ammonia. Mention may be made by way of example of N-cyclohexylmaleamide, N-octadecenylmaleamide, N,N'-dibutylmaleamide, N-benzylmaleamide and N,N'-diisotridecylmaleamide.

The monomers (a) can be used individually or in a mixture of two or more monomers (a) and are present with fractions of 1 to 80, preferably 5 to 75, more preferably 20 to 70 and very preferably 40 to 65 mol % in the monomer mixture. If the fraction of monomers (a) is lower than 1 mol %, the adsorption to the solids that are to be dispersed is weak; if it is higher than 80 mol %, the expansion of the adsorption layer that is required for steric stabilization is not achieved.

Where the copolymers are to be used as wetting agents and dispersants in aqueous systems it is advisable to use the monomers (a) in a fraction of 20 to 80 mol %, based on the sum of the monomers (a), (b), (c) and (d), in particular in a fraction of 40 to 70 mol %. If the fraction of monomers (a) in a copolymer designed for aqueous systems is less than 20 mol %, the water-solubility is insufficient in the majority of cases.

For use in non-aqueous systems and/or moulding compounds it is advisable to use the monomers (a) in a fraction of 1 to 70 mol %, based on the sum of the monomers (a), (b), (c) and (d), in particular in a fraction of 5 to 65 mol %. If the fraction of monomers (a) in this case is higher than 70 mol %, then adequate compatibility is frequently absent, particularly in the case of very apolar coating systems or moulding compounds.

Monomers (b)

The monomer (b) is an unsaturated monocarboxylic acid derivative having 12 to 30 carbon atoms, comprising synthetic and naturally occurring monocarboxylic acids and derivatives thereof having 12 to 30 carbon atoms. Particular suitability is possessed by monocarboxylic acids containing one or more carbon-carbon double bonds and having 12 to 30 carbon atoms, these monocarboxylic acids being obtainable from natural sources, such as palmitoleic acid (for example from marine animals or seed oils), oleic acid (from palm oil, for example), elaidic acid, cis-vaccenic acid, linoleic acid (from vegetable oils, for example), α- and γ-linolenic acid (from vegetable oils, for example), elaeostearic acid (from vegetable oils, for example), di-homo-γ-linolenic acid, arachidonic acid (from liver and animal fats), erucic acid and nervonic acid, for example. These fatty acids can for example also be used in the form of their mixtures. Also particularly appropriate is the use of natural products which already consist of or comprise mixtures of these fatty acids. Thus, for example, it is possible to use conjugated sunflower oil fatty acid, which is rich in linoleic acid and oleic acid, or tall oil fatty acid, which is rich in linoleic acid. These natural products are available commercially generally at favourable cost and are available in sufficient purity. The fraction of saturated fatty acids sometimes present in such natural products should be as low as possible, preferably below 20% by weight, more preferably below 10% by weight and more preferably still below 5% by weight, based on the total weight of the monomers (b). It is preferred to use straight-chain monocarboxylic acids whose double bond amenable to the polymerization is not in a terminal or exo position but is situated instead in the middle, or near the middle, of the molecule, so that in the course of copolymerization the ends of the molecule situated on either side of the double bond form side arms of the backbone of the copolymer. The unsaturated monocarboxylic acids for use as monomer (b) may also be esterified in whole or in part with the alcohols described as an esterification component under monomer (a) or with the amines described as an amidating component under monomer (a).

By measures including the use of unsaturated monocarboxylic acid derivatives as monomer (b) it has been possible to avoid the disadvantages of the use of olefins in conventional dispersants of the prior art. On the one hand, the carboxyl groups endow the polymers with additional polarity, which is helpful in connection with dispersing in aqueous or polar systems; on the other hand, any residual monomer content still present after the polymerization is far less of a disruption in aqueous or polar systems than is the case when olefins are employed. The carboxyl group, furthermore, has proven to be a suitable adsorption promoter on pigment surfaces.

The monomers (b) can be used individually or in a mixture of two or more monomers (b) and are present in the copolymer in fractions of 2 to 80 mol %, preferably 5 to 60, more preferably 10 to 40.

Where the copolymers are to be used as wetting agents and dispersants in aqueous systems it is advisable to use the monomers (b) in a fraction of 5 to 60 mol %, based on the sum of the monomers (a), (b), (c) and (d), in particular in a fraction of 5 to 40 mol %. In particular it is also advisable to use unsaturated monocarboxylic acids having 12 to 18 carbon atoms.

For use in non-aqueous systems and/or moulding compounds it is advisable to use the monomers (b) in a fraction of 5 to 80 mol %, based on the sum of the monomers (a), (b), (c) and (d), in particular in a fraction of 10 to 60 mol %. In particular it is also advisable to use unsaturated monocarboxylic acids having 16 to 30 carbon atoms.

Monomers (c)

Monomer (c) is a polyalkyleneoxyallyl ether (allyl polyether derivative), having preferably the following general formula:

$$CH_2=CH-CH_2-O-[AO]_p-R^1$$

where AO is an alkyleneoxy unit having 2 to 10 carbon atoms, $R^1$ is hydrogen, an alkyl radical having 1 to 6 carbon atoms or a radical $CO-R^2$, where $R^2$ is an alkyl radical having 1 to 6 carbon atoms, and p is chosen such that the number-average molecular weight Mn of the allyl polyether derivative is up to 5000 g/mol.

Preferably, however, the monomer (c) contains no free hydroxyl groups, since if carboxylic anhydrides are used as monomer (a) this can lead to a possibly unwanted opening of the anhydride ring during the polymerization process.

AO within the molecule may stand for identical or different alkyleneoxy units each having 2 to 10 carbon atoms.

Preferably AO is an ethyleneoxy (=EO) or propyleneoxy (=PO) unit. Through the chemical composition and the molecular weight of the polyether fraction in the allyl polyether derivative it is possible to control the water-solubility and/or polarity of the copolymer. Thus, for example, in EO- and PO-containing allyl polyethers, an increase in the EO fraction is accompanied by an increase in the hydrophilicity of the copolymer and hence in its suitability for aqueous systems.

EO/PO allyl polyether derivatives can be represented by the following general formula:

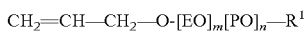

$CH_2=CH-CH_2-O-[EO]_m[PO]_n-R^1$ where $R^1$ is as defined above and the sum of m and n corresponds to p above: in other words, m and n are chosen such that the number-average molecular weight $M_n$ of the allyl polyether derivative is up to 5000 g/mol.

If the $M_n$ of the monomer (c) is above 5000 g/mol, the molecular weight of the copolymer obtained therewith is too high to still have sufficient solubility and broad compatibility.

Preferably the number-average molecular weight $M_n$ of the allyl polyether derivative is not lower than 200.

Preferably the molecular weight of the monomer (c) ranges from about 300 to 3000 g/mol, more preferably 400 to 2000 g/mol.

It is preferred to use the following allyl polyether derivatives: polyoxyethyleneallyl methyl ethers, polyoxypropylenemonoallyl methyl ethers, polyoxypropylenemonoallyl ether monoacetate, polyoxyethylene-polyoxypropyleneallyl methyl ethers. These are available, for example, from NOF Corporation under the trade names Uniox PKA®, Unisafe PKA® and Unicelin PKA®. Where allyl polyethers having different alkyleneoxy units are used, of the general formula $CH_2=CH-CH_2-O-[EO]_m[PO]_n-, -R^1$, for example, it is possible for the different alkyleneoxy units (in this case: [EO] and [PO]) to be randomly distributed in the polyalkyleneoxy group, for example, or to be present in a gradient or block structure, for example.

These allyl polyethers can be prepared in a manner known per se from allyl alcohol and oxiranes such as, in particular, ethylene oxide, propylene oxide and/or butylene oxide. The aforementioned indices m and n are controlled by the selection of appropriate molar ratios. Furthermore, in a manner known per se, by means of the selected sequence of the oxiranes, it is possible to produce different block polyalkylene oxide radicals or randomly distributed polyalkylene oxide radicals.

The monomers (c) can be used individually or in a mixture of two or more monomers (c) and are present in the copolymer with fractions of 1 to 90 mol %, preferably 5 to 60, more preferably 10 to 40. If the fraction of monomer (c) is lower than 1 mol %, it is not possible to build up a sufficient adsorption layer on the surface of the particles to be dispersed; if it is higher than 90 mol %, the affinity for the particle surface is too low. In particular, the use of a mixture of two different monomers (c), one with a relatively hydrophobic alkyleneoxy chain and one with a relatively hydrophilic alkyleneoxy chain, has proven to be advantageous. Copolymers which include such a mixture of two or more monomers (c) have particularly multi-faceted usefulness and can be used as universal wetting agents and dispersants.

Where the copolymers are to be used as wetting agents and dispersants in aqueous systems it is advisable to use the monomers (c) in a fraction of 5 to 50 mol %, based on the sum of the monomers (a), (b), (c) and (d), in particular in a fraction of 15 to 45 mol %. If the fraction of monomers (c) in a copolymer planned for an aqueous system is less than 5 mol %, there is a deterioration in the water-solubility. Furthermore, it is advantageous if, in particular, alkyleneoxy groups with particular hydrophilicity, such as EO, for example, are present.

For use in nonaqueous systems and moulding compounds it is advisable to use the monomers (c) in a fraction of 5 to 65 mol %, based on the sum of the monomers (a), (b), (c) and (d), in particular in a fraction of 10 to 50 mol %. Furthermore it is advantageous if, in particular, alkyleneoxy groups having less pronouncedly hydrophilic properties, such as PO, for example, are present.

Monomers (d)

As monomers (d) it is possible to use acrylic esters and/or methacrylic esters such as, for example, methyl (meth)acrylate, ethyl (meth)acrylate, propyl (meth)acrylate, butyl (meth)acrylate, hexyl (meth)acrylate, 2-ethylhexyl (meth)acrylate, stearyl (meth)acrylate, lauryl (meth)acrylate, cyclohexyl (meth)acrylate, benzyl (meth)acrylate, trifluoromethyl (meth)acrylate, hexafluoropropyl (meth)acrylate, tetrafluoropropyl (meth)acrylate, polypropylene glycol mono(meth)acrylates and polyethylene glycol mono(meth) acrylates; styrene, α-methylstyrene, vinyltoluene and vinylcyclohexane; vinyl esters or allyl esters of aliphatic or aromatic carboxylic acids, such as vinyl acetate, vinyl propionate, vinyl butanoate, vinyl hexanoate, vinyl octanoate, vinyl decanoate, vinyl stearate, vinyl palmitate, vinyl propionate, divinyl adipate, divinyl sebacate, vinyl 2-ethylhexanoate and vinyl trifluoroacetate, for example; allyl acetate, allyl propionate, allyl butanoate, allyl hexanoate, allyl octanoate, allyl decanoate, allyl stearate, allyl palmitate, allyl salicylate, allyl lactate, diallyl oxalate, allyl stearate, allyl succinate, diallyl glutarate, diallyl adipate, diallyl pimelate, diallyl maleate, diallyl phthalate and diallyl isophthalate; alkyl vinyl ethers such as, for example, vinyl ethyl ether and/or vinyl polyethers. These monomers are not of critical importance for the dispersing action but instead serve essentially to fine-tune the copolymer properties where necessary, in particular the compatibilities, to the requirements of the various fields of use.

The monomers (d) can be used individually or in a mixture of two or more monomers (d) and are present in the copolymer with fractions of 0 to 30 mol %, preferably 0 to 15 mol %, more preferably 0 to 5 mol % and more preferably still 0 mol %.

Where the copolymers are to be used as wetting agents and dispersants in aqueous systems it is advisable to use the monomers (d) in a fraction of 0 to 20 mol %, based on the sum of the monomers (a), (b), (c) and (d), in particular in a fraction of 0 to 5 mol %.

For use in non-aqueous systems and moulding compounds it is advisable to use the monomers (d) in a fraction of 0 to 25 mol %, based on the sum of the monomers (a), (b), (c) and (d), in particular in a fraction of 0 to 10 mol %.

Preparation of the Copolymers of the Invention and their Precursors

The copolymers of the invention can be prepared by all known customary polymerization methods, for example by emulsion, suspension, precipitation, solution and bulk polymerization. Preference is given to free-radical solution polymerization and bulk polymerization.

For the polymerization it is advantageous to include all or some of the monomers in the initial charge and to meter in free-radical initiators in the course of the polymerization. The polymerization is carried out in customary reactors, pressure-tight where appropriate, with stirrer, feed vessels and metering devices.

It is particularly advantageous to include the monomers (b) and/or (c) in the initial charge and to supply this initial charge slowly with the monomer (a). This procedure is especially advisable if dicarboxylic acid derivatives of poor solubility, such as maleic anhydride, for example, are used as monomer (a). In such cases the monomer (a) is preferably added together with a reaction initiator over a period of up to several hours, preferably less than 4 hours, more preferably within about 2 hours. The completeness of the polymerization is ensured by an after-reaction phase of up to several hours, preferably less than 4 hours, more preferably about 2 hours, and can be ascertained, for example, by means of nuclear magnetic resonance spectroscopy. Within this after-reaction time the completeness of the reaction can be increased in some cases by further addition of monomer (a) and, where appropriate, initiator.

Depending on the polymerization method used, the compounds of the invention can be prepared, in analogy to the prior art, and in accordance with viscosity, in bulk or in the presence of suitable solvents, solvent mixtures or other suitable carrier media. Examples are hydrocarbons such as toluene, xylene, aliphatic and/or cycloaliphatic petroleum fractions, chlorinated hydrocarbons such as chloroform, trichloroethane, cyclic and acyclic ethers such as dioxane, tetrahydrofuran, polyalkylene glycol dialkyl ethers, esters such as ethyl acetate, butyl acetate, butyrolactone, phthalates or other plasticizers, dicarboxylic or polycarboxylic esters, dialkyl esters of $C_{2-4}$ dicarboxylic acids, termed "Dibasic Ester", alkyl glycol esters such as ethyl glycol acetate, methoxypropyl acetate, ketones such as methyl isobutyl ketone, cyclohexanone, acetone, aliphatic alcohols such as propylene glycol, ether alcohols such as 2-butoxyethanol, diethylene glycol monobutyl ether, triethylene glycol monobutyl ether, propylene glycol monomethyl ether, 2-phenoxyethanol or 2-(2-phenoxyethoxy)ethanol, polyethers, acid amides such as dimethylformamide, N-methylpyrrolidone, etc. It is advantageous to select the solvent or solvents and/or carrier media with an eye to the planned field of use. For example, for compounds of the invention for use in water-thinnable coating systems or for coating pigments in aqueous suspension after the pigment synthesis, it is advantageous to use solvents which are wholly or partly water-dilutable. If the products are to be employed, for example, in applications where the presence of VOC (volatile organic compounds) is unwanted, the formulation should as far as possible be solvent-free or else formulation should take place in correspondingly high-boiling carrier media.

Depending on the field of application, it is possible for the solvents used for the synthesis to remain in the reaction mixture, or they are fully or partly removed and, where appropriate, replaced by other solvents or carrier media. The copolymers of the invention can also, depending on compatibility, be combined with resins, resin solutions, reactive diluents, binders, or other additives known from the prior art, such as, for example, other wetting agents and dispersants, anti-settling agents, surface-active additives such as silicones, for example, and the like.

The solvent can be fully or partly removed by means for example of distillation, where appropriate under reduced pressure and/or azeotropically with the addition of water. Alternatively the active substance can be isolated by precipitation, by adding non-solvents such as aliphatic hydrocarbons, hexane for example, followed by separation by filtration, and, where appropriate, drying. The active substance obtained by one of these methods can then be diluted in a solvent which is suitable for the particular field of application or, where appropriate, can be used in undiluted form, such as in the case of powdercoating materials, for example. Where appropriate, the solvent in which the copolymer is in solution can be distilled off following the addition of suitable higher-boiling solvents, where appropriate under reduced pressure and/or azeotropically with the addition of water. In this way the product can be transferred to a carrier medium that is suitable for the particular field of application.

In the majority of cases, moreover, the monomers that are used to prepare the copolymers of the invention make it possible to do without any solvents at all during preparation. This, in turn, is especially advantageous if the copolymers are to be used in solvent-free or aqueous systems, since consequently it is unnecessary to separate off a polymerization solvent.

The copolymerization is carried out preferably at temperatures of 60 to 220° C., more preferably at 100 to 180° C., very preferably at 120 to 160° C., preferably in the presence of commonly used free-radical-forming initiators.

Free-radical initiators are preferably selected from the group consisting of peroxides, hydroperoxides, persulphates, azo compounds and redox catalysts which comprise an oxidizing compound and a reducing component, such as ascorbic acid, glucose, hydrogen sulphites, for example. Suitability is possessed, by way of example, by 2,2-azodi (isobutyronitrile), 2,2-azodi(2-methylbutyronitrile), t-butyl permaleate, t-butyl peroxyisopropyl carbonate, t-butyl perbenzoate (TBPB), dicumyl peroxide, di-t-amyl peroxide, cumene hydroperoxide, t-butyl hydroperoxide, didodecanoyl peroxide, dibenzoyl peroxide, tert-butyl peracetate, tert-butyl 2-methylperpropionate, and particularly 2,5-dimethyl-2,5-di(tert-butylperoxy)hexane and di-t-butyl peroxide. The initiators are used advantageously in an amount of 0.1% to 10% by weight, preferably 0.2% to 5% by weight, based on the monomers employed.

The number-average molar masses of the copolymers of the invention are between 1000 and 50 000 g/mol, preferably between 1500 and 25 000 g/mol.

The molar masses and molar-mass distribution can be influenced through a corresponding choice of the reaction conditions, in particular the identity of initiator, amount of initiator, monomer proportions, and polymerization temperature. In certain cases the use of customary polymerization regulators as well may be sensible. It is customary to use short-chain aldehydes, and especially sulphur compounds such as mercaptoacetic acid, mercaptopropionic acid, n-dodecyl mercaptan, t-dodecyl mercaptan, mercaptoethanol and esters of thioglycolic acid.

The regulators can be used, for example, in an amount of 0.1% to 5% by weight.

For carrying out the polymerization the initial charge of monomers is heated to reaction temperature, where appropriate under an atmosphere of inert gas, nitrogen for example. The free-radical initiator can be metered in separately, where appropriate simultaneously with monomer (a). A similar procedure can be adopted with the regulator.

The copolymers obtained in this way can be used directly as dispersants. Alternatively their carboxyl and/or anhydride groups can first be wholly or partly amidated and/or esterified and/or neutralized or hydrolyzed for the purpose of exerting further control over the wetting and dispersing properties.

For such a purpose the copolymer is advantageously admixed with the selected alcohol, amine and/or amino alcohol at temperatures of 20 to 250° C., more preferably at 50 to 200° C., optionally under pressure, and in the presence where appropriate of suitable customary catalysts, examples being sulphonic acids such as p-toluenesulphonic acid or other alkylbenzenesulphonic acids, organometallic compounds such as dibutyltin dilaurate or titanium tetraalkoxides. The reactions may take place in bulk or a suitable inert solvent. The reaction rate is similar to that with the monomeric carboxylic anhydrides, and the reactions are generally at an end after 1 to 6 hours. The residual anhydride groups still present in the copolymer in the case of partial solvolysis can be hydrolyzed with water and neutralized, if desired, with alkali metal hydroxides, alkaline earth metal hydroxides, ammonia solution and/or amino alcohols, or can remain unreacted in the copolymer.

If desired, the hydrolysis can be performed simultaneously with the subsequent neutralization of the polymer. This applies likewise to polymers which have not been reacted with alcohols, amines and/or amino alcohols.

Amides can be formed using ammonia and also primary and secondary amines having generally 1 to 50 carbon atoms, preferably 2 to 30 carbon atoms. Examples of suitable compounds include saturated and unsaturated aliphatic and cycloaliphatic amines such as methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine and oleylamine, and also dimethylamine, diethylamine, di-n-propylamine, diisopropylamine, di-n-butylamine, diiso-butylamine, dihexylamine, dicyclohexylamine, N-methylcyclohexylamine, N,N-bis(methylcyclohexyl)amine, di-2-ethylhexylamine, di-n-octylamine, diisotridecylamine, di-tallow fatty amine, distearylamine and dioleylamine; aromatic amines such as aniline, naphthylamine, o-, m- and p-toluidine and 2-phenylethylamine and also N-ethyl-o-toluidine; alkanolamines such as ethanolamine, n-propanolamine, aminomethylpropanol, diethanolamine and di-n-propanolamine; ether amines and polyether amines such as morpholine, 4,9-dioxadodecane-1,12-diamine, 4,7,10-trioxatridecane-1,13-diamine, bis(3-aminopropyl)polytetrahydrofuran and amine-terminated polyoxyalkylenamines (commercial products: Jeffamines from Huntsman); diamines and oligoamines such as ethylenediamine, 1,3-diaminopropane, hexamethylenediamine, dipropylenediamine and 3,3'-dimethyl-4,4'-diaminophenolmethane, and also diethyltriamine, dipropyltriamine, bishexamethylenetriamine and N-tallow fatty 1,3-diaminopropane; in particular, aliphatic diamines having a primary or secondary amino group and a tertiary amino group, it being also possible for the tertiary nitrogen to be part of a heterocyclic ring, such as, for example, 2-(diethylamino)ethylmine, 3-(diethylamino)propylamine, N,N-diethyl-1,4-butane-diamine, 1-diethylamino-4-aminopentane, N-(3-aminopropyl)morpholine, N-(2-aminoethyl)piperidine, 1-methylpiperazine and aminoethylpiperazine, preferably 3-(dimethylamino)propylamine and/or N-(3-aminopropyl)imidazole.

The carboxyl or anhydride groups can be esterified with primary, secondary and tertiary alcohols each containing 1 to 50 carbon atoms, preferably 4 to 30 carbon atoms. The alcohols can be straight-chain or branched, saturated or unsaturated. Examples of suitable alcohols are aliphatic and cycloaliphatic alcohols such as methanol, ethanol, n-propanol, isopropanol, n-butanol, isobutanol, pentanol, hexanol, octanol, 2-ethylhexanol, nonanol, decanol, dodecanol, tridecanol and the isomers thereof, cyclohexanol, fatty alcohols such as tallow fatty alcohol, stearyl alcohol and oleyl alcohol, oxo-processed alcohols such as C9/C11 oxo alcohol and C13/C15 oxo alcohol; Ziegler alcohols having 12 to 24 carbon atoms, aromatic alcohols such as alkylphenols, bisphenol A and ethoxylated alkylphenols; diols, oligools and polyols such as ethylene glycol, 1,10-decanediol, 2-ethyl-2-hydroxymethylpropane-1,3-diol, glycerol, pentaerythritol, sorbitol and glucose; ether alcohols and polyether diols such as ethylene glycol monoethyl ether, di- and triethylene glycol monoethyl ether, 2-butoxyethanol, di- and triethylene glycol monobutyl ether, propylene glycol monomethyl ether, 2-phenoxyethanol or 2-(2-phenoxyethoxy)ethanol, polytetrahydrofuran, polyethylene glycols and polypropylene glycols.

To neutralize the acid groups it is possible, besides the abovementioned alkali metal hydroxides, alkaline earth metal hydroxides and ammonia, to use primary, secondary or tertiary amines and amino alcohols. Examples of common bases include calcium hydroxide, magnesium hydroxide, butylamine, dibutylamine, triethylamine, N-oleyl-1,3-propanediamine, dimethylaminoethanol, diethylaminoethanol, aminomethylpropanol, 2-dibutylaminoethanol, mono-, di- or polyamine alkoxylates, monoethanolamine, diethanolamine or triethanolamine, N,N-bis[poly(oxyethylene)]-N-oleylamine; sodium hydroxide and/or potassium hydroxide, preferably in the form of commercially customary 25% to 50% by weight strength alkali solution, or amino alcohols.

The degree of neutralization is guided by the hydrophilicity of the copolymer and by its intended use. Thus hydrophilically adjusted polymers need far less neutralization than those which have been hydrophobically adjusted. In some cases it is advantageous to employ the base in excess, as for example in the case of use in systems which have been rendered strongly basic. The degree of neutralization is also dependent on the identity of neutralizing agent. Thus when using triethylamine the degree of neutralization set must be higher than when using potassium hydroxide. Solubility, dispersing characteristics and stability of the end products depend, inter alia, on the degree of neutralization. In general a degree of neutralization of 0 to 100% of the acid groups still present in the copolymer after complete hydrolysis of the anhydride groups, in particular 50% to 100%, is desired. In many cases, however, the copolymers can also be used without neutralization.

The neutralization is performed preferably at temperatures of 40 to 100° C., more preferably 50 to 70° C., by homogenization with water and addition of the neutralizing agent. Higher temperatures can be employed in pressure reactors, in which case it is necessary to take account of the hydrolytic stability of any ester groups and amide groups present. The anhydride groups present in the copolymer are hydrolyzed, in the course of this procedure, to carboxyl groups and so are included in the neutralization. The pH of the ready-to-use polymer dispersion is 4 to 10, preferably 5 to 8, more preferably 7+/−0.5.

As well as the solvolysis or hydrolysis and/or neutralization of free carboxyl groups, it is also possible, through a choice of appropriate reaction conditions, to generate imide structures from the dicarboxylic anhydride units of the copolymer, using ammonia or primary amines. These imide-functionalized copolymers can be converted to an aqueous dispersion or solution in the same way as for the esterified or amidated copolymers.

By varying the molecular weight and the identity and amount of the monomers (a) to (d) that are used it is possible to tailor the effectiveness and compatibility of the compounds of the invention to any of a very wide variety of solvents, carrier media, binders, resins, solids and, where appropriate, further polymeric compounds that are present in coating compositions and moulding compounds in which the products according to the invention are employed.

For use in highly polar systems, such as waterborne paints and electrodeposition coatings, for example, the polymers ought to contain a sufficiently high proportion of polar groups, such as polyethylene oxides and/or carboxylate groups, for example, in order to achieve a water-solubility which is favourable for the particular area of use. This proportion of hydrophilic groups, however, should also not be too high, if in certain applications it results in an unwanted increase in sensitivity to water.

In the case of use in apolar systems such as long-oil alkyd paints, PVC plastisols or polyolefins, there should be an appropriate fraction of apolar groups, and in the case of use in systems where a broad compatibility is important, such as pigment concentrates, for example, a balanced combination of polar and apolar groups is of advantage.

The copolymers of the invention are outstandingly suitable as wetting agents and dispersants for solids, particular for aqueous, solventborne or solvent-free polymeric compositions, paints, printing inks, such as polyvinyl chloride, graphics inks, toners, ink-jet inks, powdercoating materials or UV coating materials.

The dispersants of the invention can be used in accordance with the prior art for known dispersants, using the dispersants according to the invention instead of those known from the prior art. Thus they can be used, for example, in the preparation of pigmented and/or filled paints, printing inks, pastes, pigment concentrates and/or polymeric compositions, such as polyvinyl chloride, for example, unsaturated polyesters, polyolefins, polyurethanes, etc. By way of example the dispersants can be used for preparing pigmented paints, where film-forming binders, e.g. alkyd resins, polyester resins, acrylate resins, polyurethane resins or epoxy resins, and/or solvents, pigments and, where appropriate, fillers, the dispersant and customary auxiliaries are mixed. Examples of water-based coatings are emulsion paints, anodic or cathodic electrodeposition coatings, for car bodies for example, or aqueous two-component coating materials.

The dispersants of the invention are also suitable in particular for producing concentrates of solids, such as pigment concentrates, for example. For that purpose the compounds of the invention are introduced in a carrier medium such as organic solvents, plasticizers and/or water and the solids for dispersion are added with stirring. These concentrates may further comprise binders and/or other auxiliaries. These solids concentrates can then be incorporated into different binders. Alternatively, pigments can be dispersed without solvent directly in the dispersants of the invention, and are then particularly suitable for pigmenting thermoplastic and thermoset polymer formulations.

The invention lastly also provides for the use of a dispersant of this kind for producing a pigmented coating on a substrate, the pigmented coating material being applied to the substrate and the pigmented coating material applied to the substrate being baked or cured or crosslinked.

The dispersants can be used alone or together with binders which are customary according to the prior art. In the case of use in polyolefins, for example, it may be advantageous to use corresponding low molecular mass polyolefins as carrier materials, together with the dispersant.

Another inventive use of the dispersants consists in the production of dispersible solids in powder particle and/or fibre particle form, particularly of dispersible pigments or polymeric fillers, where the particles are coated with the dispersant. Coatings of this kind, of both organic and inorganic solids, are carried out in a known way, as described for example in EP-A-0 270 126. In this case the solvent or emulsion medium can either be removed or remain in the mixture, forming pastes. These pastes are customary commercial products and may further comprise binder fractions and also further auxiliaries and additives. Specifically in the case of pigments it is possible to coat the pigment surface during or after the synthesis of the pigments, by, for example, adding the dispersants of the invention to the pigment suspension, or during or after the operation of pigment finish. The pigments pretreated in this way are notable for greater ease of incorporation and also for enhanced viscosity, flocculation and gloss performance and for higher colour strength, as compared with untreated pigments.

Besides their above-described application as dispersants and/or coating materials for pulverulent and fibrous solids, the dispersants of the invention can also be employed as viscosity reducers and compatibilizers in synthetic resins or for enhancing the compatibility of mixtures of incompatible components such as polymer blends, for example. Examples of such synthetic resins are those known as sheet moulding compounds (SMC) and bulk moulding compounds (BMC), which are composed of unsaturated polyester resins with high levels of filler and fibre. Their preparation and processing is described by way of example in DE-A-36 43 007.

A further example are incompatible polyol mixtures, polyisocyanate mixtures or polyol/blowing agent mixtures which are used for polyurethane production. As a result of the dispersants of the invention it is possible in many cases partly or even wholly to avoid the separation problems that result from this incompatibility.

The dispersants of the invention are used generally in an amount of 0.5% to 100% by weight, based on the solid to be dispersed. For dispersing specific solids, however, it may also be necessary to use higher amounts of the dispersants.

The amount of dispersant is essentially dependent on the surface area to be covered on the solid to be dispersed. Carbon black, for example, requires substantially greater amounts of dispersant than, for example, $TiO_2$.

Examples of pulverulent or fibrous solids are those as have been coated with dispersants in accordance with the prior art, particularly organic and inorganic pigments which are used in paints, other coating materials, moulding compounds or other plastics, and organic or inorganic fillers which are used for filling or reinforcing paints, other coating compositions, moulding compounds or other plastics. One subgroup of such fillers are fibres, organic and/or inorganic in nature, which are likewise used as fillers or reinforcing materials.

Examples of pigments include mono-, dis-, tris- and polyazopigments, oxazine, dioxazine and thiazine pigments, diketopyrrolopyrroles, phthalocyanines and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides of nickel, titanium, zinc, manganese, cobalt, iron, chromium, antimony, magnesium and/or aluminium (for example, nickel titanium yellow or chromium titanium yellow), magnetic pigments based on pure iron, iron oxides and chromium oxides or mixed oxides, metallic effect pigments such as aluminium bronzes, pearlescent pigments, and fluorescent and phosphorescent luminescent pigments.

Examples of pulverulent or fibrous fillers are, for example, those composed of pulverulent or fibrous particles of alumina, aluminium hydroxide, silica, kieselguhr, siliceous earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found for example in EP-A-0 270 126.

In addition it is also possible to carry out outstanding dispersing and stabilizing of mineral fillers, such as calcium carbonate or calcium oxide, for example, and also of flame retardants, such as aluminium hydroxide or magnesium hydroxide, for example, and of matting agents such as silicas, for example.

In the text below, the copolymers of the invention are illustrated in more detail with reference to examples.

EXAMPLES

Preparation Examples

Unless indicated otherwise, indications of an average molecular weight refer to the number-average molecular weight $M_n$.

Example 1

Copolymer of: 12 mol of maleic anhydride (MAA), 4.5 mol of tall oil fatty acid, 4.5 mol of conjugated sunflower fatty acid and 3 mol of polyoxyethyleneallyl methyl ether (having an average MW (molecular weight) of 450 g/mol)

A mixture of 40.6 g of tall oil fatty acid (equivalent weight (EW)=289 g/mol), 39.5 g of conjugated sunflower fatty acid (EW=281 g/mol), 36.7 g (0.3745 mol) of MAA and 42.1 g (0.0936 mol) of polyoxyethyleneallyl methyl ether was introduced into a vessel and heated to 137° C. with stirring. Over the course of 4 hours a solution of 4.24 g of tert-butyl perbenzoate (TBPB) in 53 g of dipropylene glycol dimethyl ether was added dropwise. After the end of the addition the mixture was stirred at 137° C. for a further 0.5 hour. The product obtained possesses a solids content (SC) of 75%.

Example 2

Reaction product between the product from Example 1 and Jeffamine M 2070 (primary monoamine alkoxylate having an EO/PO ratio of 70/30 and an average MW of 2000; from Huntsman)

91 g of the product from Example 1 are mixed with 84 g of Jeffamine M 2070 and 0.18 g of p-toluenesulphonic acid and the mixture is stirred at 170° C. for 3 hours. Subsequently a water separator is fitted and the water of reaction is distilled off at 170° C. for 3 hours. The product obtained has an amine number of <1 and an acid number of about 46.

Example 3

Reaction product between the product of Example 1 and benzylamine 108 g of the product from Example 1 are mixed with 8 g of benzylamine and 0.12 g of p-toluenesulphonic acid and the mixture is stirred at 170° C. for 3 hours. Subsequently the water of reaction is distilled off over the course of 3 hours. The temperature is 170° C. at the beginning and at the end of the distillation is raised in steps to 182° C. The product obtained possesses an SC of 100%.

Example 4

Salification product between the product from Example 3 and diethylethanolamine 39 g of the product from Example 3 are homogenized with 142 g of distilled water. Subsequently 5 g of diethylethanolamine are added slowly at room temperature. Following the addition the mixture is stirred at 50° C. for a further 5 minutes. The pH of the mixture is 7.

Example 5

Copolymer of: 12 mol of MAA, 4 mol of tall oil fatty acid, 4 mol of conjugated sunflower fatty acid, 3 mol of polyoxyethyleneallyl methyl ether (having an average MW of 1100 g/mol) and 1 mol of polyoxypropylene monoallyl ether monoacetate (having an average MW of 1600 g/mol)

A mixture of 24.8 g of tall oil fatty acid (EW=289), 24.1 g of conjugated sunflower fatty acid (EW=281), 25.2 g (0.257 mol) of MAA, 70.7 g (0.0643 mol) of polyoxyethyleneallyl methyl ether and 36.2 g (0.0226 mol) of polyoxypropylene monoallyl ether monoacetate was introduced into a vessel and heated to 137° C. with stirring. Over the course of 4 hours a solution of 4.83 g of TBPB in 60 g of dipropylene glycol dimethyl ether was added dropwise. After the end of the addition the mixture was stirred at 137° C. for a further 0.5 hour.

The product obtained possesses an SC of 76%.

Example 6

Salification product between the product from Example 5 and diethylethanolamine 54 g of the product from Example 5 are homogenized with 31 g of distilled water. Subsequently 7.8 g of diethylethanolamine are added slowly at room temperature. Following the addition the mixture is stirred at 50° C. for a further 5 minutes. The pH of the mixture is 7.

Example 7

Copolymer of: 12 mol of MAA, 4 mol of tall oil fatty acid, 5 mol of polyoxyethyleneallyl methyl ether (having an average MW of 1100 g/mol) and 5 mol of polyoxypropylene monoallyl ether monoacetate (having an average MW of 1600 g/mol)

A mixture of 7.2 g of tall oil fatty acid (EW=289), 14.7 g (0.15 mol) of MAA, 68.9 g (0.0626 mol) of polyoxyethyleneallyl methyl ether and 106 g (0.0663 mol) of polyoxypropylene monoallyl ether monoacetate was introduced into a vessel and heated to 137° C. with stirring. Over the course of 4 hours a solution of 5.25 g of TBPB in 66 g of dipropylene glycol dimethyl ether was added dropwise. After the end of the addition the mixture was stirred at 137° C. for a further 0.5 hour.

Example 8

Salification product between the product from Example 7 and diethylethanolamine 6.1 g of diethylethanolamine are homogenized with 41 g of distilled water and 37.6 g of dipropylene glycol dimethyl ether. Subsequently 79 g of the product from Example 7 are added slowly at 60° C. Following the addition the mixture is stirred at 60° C. for a further 15 minutes.

Example 9

Copolymer of: 12 mol of MAA, 8 mol of monophenyl glycol ester of a conjugated sunflower fatty acid (having an average equivalent weight of 430 g/mol), 3 mol of polyoxyethyleneallyl methyl ether (having an average MW of 1100 g/mol) and 1 mol of polyoxypropylene monoallyl ether monoacetate (having an average MW of 1600 g/mol)

A mixture of 80 g (0.1844 eq) of monophenyl glycol ester, 27.1 g (0.2765 mol) of MAA, 76 g (0.0692 mol) of polyoxyethyleneallyl methyl ether and 39 g (0.0244 mol) of polyoxypropylene monoallyl ether monoacetate was introduced into a vessel and heated to 137° C. with stirring. Over the course of 4 hours a solution of 5.92 g of TBPB in 74 g of dipropylene glycol dimethyl ether was slowly added dropwise. After the end of the addition the mixture was stirred at 137° C. for a further 0.5 hour. The product obtained possesses an SC of 75%.

Example 10

Salification product between the product from Example 9 and diethylethanolamine 6 g of diethylethanolamine are homogenized with 40 g of distilled water and 26.6 g of dipropylene glycol dimethyl ether. Subsequently 66 g of the product from Example 9 are added slowly at 60° C. Following the addition the mixture is stirred at 60° C. for a further 15 minutes.

Example 11

Salification product between the product from Example 9 and diethylethanolamine and Also an ethoxylated oleylamine having an average equivalent weight of 770 g/mol 4.1 g of diethylethanolamine and 12.8 g of oleylamine ethoxylate are homogenized with 0.6 g of distilled water and 41 g of butyl glycol. Subsequently 50 g of the product from Example 9 are added slowly at 60° C. Following the addition the mixture is stirred at 60° C. for a further 15 minutes.

Example 12

Copolymer of: 12 mol of MAA, 6 mol of conjugated sunflower fatty acid, 6 mol of polyoxypropylene monoallyl ether monoacetate (having an average MW of 2200 g/mol)

36 g of conjugated sunflower fatty acid (EW=281), 50 g (0.5102 mol) of MAA and 563 g (0.256 mol) of polyoxypropylene monoallyl ether monoacetate were introduced into a vessel and heated to 137° C. with stirring. Over the course of 2 hours 10.7 g of TBPB were added dropwise. After the end of the addition the mixture was stirred at 137° C. for a further hour.

Example 13

Salification product between the product from Example 12 and diethylethanolamine 19 g of diethylethanolamine are homogenized with 240 g of distilled water. Subsequently 143 g of the product from Example 12 are added slowly at 60° C. Following the addition the mixture is stirred at 60° C. for a further 30 minutes.

Example 14

Copolymer of: 13.2 mol of MAA, 1.5 mol of tall oil fatty acid, 3 mol of conjugated sunflower fatty acid, 4 mol of polyoxyethyleneallyl methyl ether (having an average MW of 1100 g/mol), 1.5 mol of polyoxypropylene monoallyl ether monoacetate (having an average MW of 1600 g/mol) and 2 mol of polyoxyethylene-polyoxypropylene-allyl methyl ether (EO/PO: 70/30, Mn: 1850 g/mol)

A mixture of 8.7 g of tall oil fatty acid (EW=289), 16.9 g of conjugated sunflower fatty acid (EW=281), 26 g (0.265 mol) of MAA, 88.4 g (0.08 mol) of polyoxyethyleneallyl methyl ether, 48.2 g (0.03 mol) of polyoxypropylene monoallyl ether monoacetate and 72.3 g (0.039 mol) of polyoxyethylene-polyoxypropylene-allyl methyl ether was introduced into a vessel and heated to 140° C. with stirring. Over the course of 4 hours 4.9 g of di-tert-butyl peroxide were added dropwise. After the end of the addition the mixture was stirred at 140° C. for a further 0.5 hour.

Example 15

Salification product between the product from Example 14 and diethylethanolamine 8 g of diethylethanolamine are homogenized with 114 g of distilled water. Subsequently 68 g of the product from Example 14 are added slowly at 60° C. Following the addition the mixture is stirred at 60° C. for a further 30 minutes.

Example 16

Reaction product between the product from Example 1 and dimethylaminopropylamine 11.3 g of N,N-dimethylaminopropylamine are dissolved in 120 g of xylene and the solution is heated to 120° C. Then, over the course of 20 minutes, 151 g of the product from Example 1 are added. Following the addition of 0.7 g of 2,6-di-tert-butyl-p-cresol the mixture is stirred under reflux for an hour. Subsequently the water of reaction is removed at approximately 144° C. The xylene is distilled off and replaced by the same amount of methoxypropyl acetate.

Example 17

Copolymer of: 16 mol of MAA, 2 mol of tall oil fatty acid, 3 mol of conjugated sunflower fatty acid, 4 mol of polyoxyethyleneallyl methyl ether (having an average MW of 1100 g/mol), 1.5 mol of polyoxypropylene monoallyl ether monoacetate (having an average MW of 1600 g/mol) and 2 mol of polyoxyethylene-polyoxypropylene-allyl methyl ether (EO/PO: 70/30, Mn: 1850 g/mol)

A mixture of 10.7 g of tall oil fatty acid (EW=289), 15.6 g of conjugated sunflower fatty acid (EW=281), 81.4 g of polyoxyethyleneallyl methyl ether, 44.4 g of polyoxypropylene monoallyl ether monoacetate and 66.6 g of polyoxyethylene-polyoxypropylene-allyl methyl ether was introduced into a vessel and heated to 140° C. with stirring. Over the course of 4 hours 3.7 g of di-tert-butyl peroxide were metered in continuously and at the same time 29 g of MAA were added in portions. After the end of the addition the mixture was stirred at 140° C. for a further 0.5 hour.

Example 18

Product from Example 14 diluted in water 116 g of distilled water were introduced into a vessel and heated to about 50° C. Subsequently 79 g of the product from Example 14 were slowly added. Following the addition the system was stirred at 80° C. for 30 minutes. The product, which is slightly turbid, has a solids content (SC) of 40% and is of low viscosity.

Use Examples

The compounds of the invention were assessed by preparing aqueous pigment concentrates based on two different pigments. After one day of storage at 20° C. their viscosity was evaluated visually: the lower the viscosity, the better the dispersion outcome. The figures in the formulae below are in grams. As a non-inventive, comparative example the product from Preparation Example 1 of EP 1142972 A2 was used (copolymer of maleic anhydride with methylpolyethylene glycol monovinyl ether and polypropylene glycol-bis-maleamic acid).

To prepare the pigment pastes the ingredients indicated in the tables below are weighed out in succession into the thermostatted vessel of a Dispermat, admixed with an equal amount of 1 or 2 mm glass beads, and then dispersed using a 40 mm Teflon disc at 40° C. In the case of the titanium dioxide Tioxide TR-85 the dispersing time is 30 minutes at a peripheral speed of 18 m/s (8000 rpm) with 2 mm glass beads and in the case of the phthalocyanine blue Heliogenblau L7101F it is 40 minutes at a peripheral speed of 23 m/s (10 000 rpm) with 1 mm glass beads. The pH of the pigment concentrates was adjusted to 8.0 using AMP 90 (aminomethylpropanol).

The dispersed pastes are sieved through a paper sieve (mesh size 80 µm) and transferred into glass bottles. With the addition compounds of the invention, fluid pigment pastes having very good rheological properties are obtained. With the non-inventive, comparative compound, in contrast, the blue paste in particular showed a significantly higher viscosity.

Delta E of the white reductions was determined in accordance with DIN 5033 using the "TCS" instrument from Byk-Gardner.

Paste formulas: (Amounts in parts by weight)

|  | Tioxide TR-85 | Heliogenblau L7101F |
| --- | --- | --- |
| Water | 26.0 | 27.0 |
| Dispersant from preparation example (at 40%)* | 9.3 | 16.3 |
| BYK ®-011 | 1.0 | 1.0 |
| Proxel GXL | 0.1 | 0.1 |
| AMP 90 | 0.1 | 0.1 |
| Byk ®-420 | 0.5 | 0.5 |
| Tioxide TR-85 | 63.0 | — |
| Heliogenblau L7101F | — | 55.0 |

*Products with a higher solids content were likewise diluted to 40% with water, in order to ensure comparability.

Using these white and blue pastes, white reductions were produced in an aqueous two-component (2K) epoxy system (Aradur 39 BD/Araldite PZ 756/67 BD from Vantico) and in an aqueous 2K polyurethane varnish (Setalux 6511 AQ-47/Bayhydur 3100, Desmodur VP LS 2150/1, from Bayer).

2K EP Varnish:

| Component A | | |
| --- | --- | --- |
| Aradur 39 BD | 41.00 | |
| demin. water | 16.00 | |
| Dowanol PnB | 9.00 | |
| BYK ®-347 | 0.13 | (0.2% based on Comp. A) |
| Component B | | |
| | 66.13 | |
| Araldite PZ 756/67 BD | 34.00 | |
| | 100.13 | |

Mixing ratio Comp. A Comp. B = 66:34
+30% demineralized water based on total formula 2K EP Varnish:

| Component A | |
| --- | --- |
| Setalux 6511 AQ-47 | 53.6 |
| dem in. water | 10 |
| Solvesso 100 (SN) | 1.3 |
| BYK ®-345 | 0.2 |
| BYK ®-333 | 0.2 |
| Component B | |
| Bayhydur 3100 | 11 |
| Desmodur VP LS 2150/1 | 20.4 |
| Butyl acetate | 2.6 |
| Butyl glycol acetate | 1 |
| | 100.3 |

Mixing ratio Comp. A Comp. B = 65:35
+20% demineralized water based on total formula The flocculation stability was assessed by means of rubout tests. For the purpose of these tests the paint is poured out onto a glass plate inclined at an angle of about 80°, left to evaporate until shortly before initial drying, and then rubbed with the finger over about ⅓ of its area until a consistent colour is obtained. After the film has cured the difference in colour strength of both the rubbed-out area and the unrubbed area is determined, as the DeltaE value. The smaller the DeltaE value, the better the stabilization of the pigments with respect to flocculation and separation phenomena.

The chemical characteristics of the commercial products indicated in formulas above are as follows: Aradur 39 BD is an amine hardener; Araldite PZ 756/67 BD is an epoxy resin emulsion; Bayhydur 3100 is an HDI-based polyisocyanate; Byk-011 is a silicone-free defoamer based on polymeric substances and hydrophobic solids; Byk®-333, Byk®-345 and Byk®-347 are polyether-modified polysiloxanes; Byk-420 is a rheology additive based on a modified urea; Desmodur VP LS 2150/1 is an IPDI-based polyisocyanate; Dowanol PnB is a propylene glycol butyl ether; Proxel GXL is a preservative; Setalux 6511 AQ-47 is a hydroxy-functional polyacrylate resin; and Solvesso 100 (SN) is solvent naphtha.

Blending of the Varnish with White Paste and Colour Paste

White paste was added to the varnish such that the varnish/white paste mixtures indicated below contain 20% of TiO$_2$.

| Varnish (stock varnish => Comp. A) + white paste | 28 |
| --- | --- |
| Colour paste | 2 |
| | 30 |

Mix for 5 minutes using the Skandex shaker

Results: White Blends in 2K EP and 2K PU Systems after 1 Day

| Dispersant | Aradur 39BD/ Araldite PZ 756/67 BD TR-85/L 7101 F | | | |
|---|---|---|---|---|
| | Gloss 20° | Haze | DE | Appearance |
| Example 8 | 92 | 69 | 2.9 | OK |
| Example 10 | 95 | 35 | 1.5 | OK |
| Example 11 | 100 | 31 | 1.6 | OK |
| Example 14 | 99 | 35 | 0.5 | OK |
| Example 18 | 98 | 17 | 1.3 | OK |
| Comparative example | 18 | 339 | 10 | bits |

| Dispersant | Setalux 6511 AQ-47/ Bayhydur 3100/Desmodur 2150/1 TR-85/L 7101 F | | | |
|---|---|---|---|---|
| | Gloss 20° | Haze | DE | Appearance |
| Example 8 | 76 | 39 | 0.8 | OK |
| Example 14 | 75 | 50 | 1.5 | OK |
| Example 18 | 77 | 12 | 0.9 | OK |
| Comparative example | 75 | 75 | 4.4 | bits |

The white blends produced using the non-inventive, comparative example, owing to their flocculation tendency, show the greatest floating, and exhibit a low gloss, high haze values and surface defects in the form of bits, owing to inadequately ground pigment particles.

The invention claimed is:

1. A copolymer comprising a copolymerization product of (a) 1 to 80 mol % of at least one ethylenically unsaturated 1,2-dicarboxylic acid derivative, (b) 2 to 80 mol % of at least one unsaturated monocarboxylic acid derivative having 12 to 30 carbon atoms and having its unsaturated bond at a non-terminal position, (c) 1 to 90 mol % of at least one polyalkyleneoxyallyl ether having a number-average molecular weight of up to 5000 g/mol and (d) a 0 to 30 mol % of further, unsaturated monomer, which is not a monomeric compound of (a), (b) or (c); and a salt reaction product of the copolymer with ammonia, amines, water, alcohols, amino alcohols and/or alkali metal hydroxides or alkaline earth metal hydroxides.

2. A copolymer according to claim 1, comprising the copolymerization reaction product of (a) 20 to 70 mol % of at least one ethylenically unsaturated 1,2-dicarboxylic acid derivative, (b) 5 to 60 mol % of at least one unsaturated monocarboxylic acid derivative having 12 to 30 carbon atoms, (c) 5 to 60 mol % of at least one polyalkyleneoxyallyl ether having a number-average molecular weight of up to 5000 g/mol and (d) 0 to 15 mol % of further, unsaturated monomers; and the salt reaction product of the copolymer with ammonia, amines, water, alcohols, amino alcohols and/or alkali metal hydroxides or alkaline earth metal hydroxides.

3. A copolymer according to claim 1, comprising a copolymerization reaction product of (a) 40 to 65 mol % of at least one ethylenically unsaturated 1,2-dicarboxylic acid derivative, (b) 10 to 40 mol % of at least one unsaturated monocarboxylic acid derivative having 12 to 30 carbon atoms, (c) 10 to 40 mol % of at least one polyalkyleneoxyallyl ether having a number-average molecular weight of up to 5000 g/mol and (d) 0 to 5 mol % of further, unsaturated monomers; and the reaction product of the copolymer with ammonia, amines, water, alcohols, amino alcohols and/or alkali metal hydroxides or alkaline earth metal hydroxides.

4. A copolymer according to claim 1, wherein the ethylenically unsaturated 1,2-dicarboxylic acid derivative is selected from the group consisting of anhydrides, imides, monoesters, diesters, monoamides and diamides of ethylenically unsaturated 1,2-dicarboxylic acids and also the unsaturated 1,2-dicarboxylic acids themselves.

5. A copolymer according to claim 3, wherein the ethylenically unsaturated 1,2-dicarboxylic acid or the 1,2-dicarboxylic acid on which the 1,2-dicarboxylic acid derivative is based is selected from the group consisting of maleic acid, fumaric acid, itaconic acid, mesaconic acid and citraconic acid.

6. A copolymer according to claim 1 wherein the ethylenically unsaturated 1,2-dicarboxylic acid derivative is the anhydride of maleic acid.

7. A copolymer according to claim 1, wherein the unsaturated monocarboxylic acid derivative contains 12 to 24 carbon atoms.

8. A copolymer according to claim 7, wherein the unsaturated monocarboxylic acid derivative is an unsaturated monocarboxylic acid or a mixture of unsaturated monocarboxylic acids and is selected from the group consisting of palmitoleic acid, oleic acid, elaidic acid, cis-vaccenic acid, linoleic acid, α- and γ-linolenic acid, elaeostearic acid, di-homo-γ-linolenic acid, arachidonic acid, erucic acid, nervonic acid, sunflower oil fatty acid and tall oil fatty acid.

9. A copolymer according to claim 1 wherein the polyalkyleneoxyallyl ether possesses the following general formula:

$$CH_2=CH-CH_2-O-[AO]_p-R^1$$

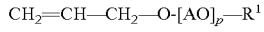

wherein AO is an alkyleneoxy unit having 2 to 10 carbon atoms, $R^1$ is hydrogen, an alkyl radical having 1 to 6 carbon atoms or a radical $CO-R^2$, where $R^2$ is an alkyl radical having 1 to 6 carbon atoms, and p is chosen such that the number-average molecular weight $M_n$ of the polyalkyleneoxyallyl ether is not more than 5000 g/mol.

10. A copolymer according to claim 7, wherein the polyalkyleneoxyallyl ether possesses the following general formula:

$$CH_2=CH-CH_2-O-[EO]_m[PO]_n-R^1$$

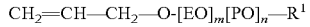

wherein $R^1$ is an alkyl radical having 1 to 6 carbon atoms or a radical $CO-R_2$, where $R^2$ is an alkyl radical having 1 to 6 carbon atoms, EO is an ethyleneoxy group, PO is a propyleneoxy group and the sum of m and n is chosen such that the number-average molecular weight $M_n$ of the polyalkyleneoxyallyl ether is not more than 5000 g/mol.

11. A copolymer according to claim 1, wherein the further unsaturated monomer (d) is selected from the group consisting of acrylic esters, methacrylic esters, styrene, α-methylstyrene, vinyltoluene, vinylcyclohexane, vinyl esters, alkyl vinyl ethers and/or vinyl polyethers.

* * * * *